United States Patent
Attarwala et al.

(10) Patent No.: US 6,673,875 B2
(45) Date of Patent: Jan. 6, 2004

(54) ANAEROBIC COMPOSITIONS WITH ENHANCED TOUGHNESS AND CRACK RESISTANCE

(75) Inventors: Shabbir Attarwala, Simsbury, CT (US); Richard D. Rich, Avon, CT (US); Natalie R. Li, Middletown, CT (US)

(73) Assignee: Henkel Loctite Corporation, Rocky Hill, CT (US)

( * ) Notice: Subject to any disclaimer, the term of this patent is extended or adjusted under 35 U.S.C. 154(b) by 35 days.

(21) Appl. No.: 10/169,607

(22) PCT Filed: Mar. 27, 2001

(86) PCT No.: PCT/US01/09782

§ 371 (c)(1), (2), (4) Date: Jul. 3, 2002

(87) PCT Pub. No.: WO01/72917

PCT Pub. Date: Oct. 4, 2001

(65) Prior Publication Data

US 2003/0036601 A1 Feb. 20, 2003

Related U.S. Application Data

(60) Provisional application No. 60/193,015, filed on Mar. 29, 2000.

(51) Int. Cl.[7] ............................. C09J 4/00; C09J 4/06; C09J 109/02; C09J 113/00
(52) U.S. Cl. .................. 525/450; 525/452; 525/453; 525/454; 525/455; 525/457; 525/458; 525/460
(58) Field of Search .................. 525/450, 452, 525/453, 454, 455, 457, 458, 460

(56) References Cited

U.S. PATENT DOCUMENTS

| | | | |
|---|---|---|---|
| 3,425,988 A | 2/1969 | Gorman et al. | 260/47 |
| 4,018,851 A | 4/1977 | Baccei | 260/859 |
| 4,295,909 A * | 10/1981 | Baccei | 156/307.3 |
| 4,308,526 A | 12/1981 | Smith | 340/347 |
| 4,447,563 A * | 5/1984 | Kanaoka et al. | 523/176 |
| 4,467,071 A | 8/1984 | Dawdy | 525/115 |

FOREIGN PATENT DOCUMENTS

| | | | |
|---|---|---|---|
| EP | 658 582 | 6/1995 | |
| JP | 58 191775 | 11/1983 | |
| JP | 60 251152 | 12/1985 | |
| JP | 60251152 A * | 12/1985 | C03C/25/02 |
| JP | 04 159317 | 6/1992 | |

* cited by examiner

Primary Examiner—Kelechi C. Egwim
(74) Attorney, Agent, or Firm—Steven C. Bauman

(57) ABSTRACT

An anaerobic adhesive composition having enhanced toughness and resistance to crack propagation, particularly subsequent to thermal exposure, comprising a combination of three monomers consisting of (a) at least one (meth) acrylate monomer, (b) at least one (meth)acrylate-terminated urethane modified acrylonitrile/butadiene prepolymer, and (c) at least one (meth)acrylate-terminated acrylic/polyisocyanate adduct.

16 Claims, 2 Drawing Sheets

ANAEROBIC COMPOSITIONS WITH ENHANCED TOUGHNESS AND CRACK RESISTANCE

The application claim the benefit of Provisional application Ser. No. 60/193,015, filed Mar. 29, 2000.

FIELD OF THE INVENTION

This invention relates to anaerobic adhesive compositions, the reaction products of which demonstrate enhanced toughness and resistance to crack propagation. More particularly, the reaction products of the present invention exhibit increased toughness after exposure to thermal shock, while retaining their room temperature performance properties.

BACKGROUND OF RELATED TECHNOLOGY

Numerous applications employing anaerobic compositions require certain toughness properties to be fully effective. For example, in certain applications where high compressive loads are placed on the cured anaerobic composition such as in load-bearing joint applications, it is useful for the compositions to retain their structural integrity and performance characteristics to properly serve their role. Toughness is often measured by physical testing, such as impact tests, compression tests and resistance to crack propagation tests, among others. Other indications, however, exist which are known to be indicative of toughness. For example, the presence of discreet domains or phase separation of the cured components is considered an indication of enhanced toughness, when one of the phases is known to be more "rubbery" and less brittle than another phase. Achieving an anaerobic composition which exhibits toughness using either of these toughness indicators involves the balancing of numerous factors and is difficult to achieve. Various attempts at providing anaerobic compositions having enhanced toughness properties have not provided entirely satisfactory results.

One attempt to achieve a toughened anaerobic composition is disclosed in U.S. Pat. No. 4,018,851 to Baccei. This patent provides polymerizable compositions based on prepolymers which are derived from the reaction between vinyl grafted poly(alkylene)ether polyols and organic polyisocyanates. These prepolymers are also (meth)acrylate terminated. The prepolymers are cured by free radical generating initiators, such as peroxy compounds or ultraviolet sensitive compounds. This patent focused on compositions which produced reaction products having a combination of relatively rigid and flexible alternating segments to obtain greater impact resistance. This technology was expanded further in U.S. Pat. No. 4,308,526, also to Baccei. In the '526 patent, hydroxyalkyl (meth)acrylate or aminoalkyl (meth) acrylate were reacted with the reaction products disclosed in the aforementioned '851 patent to achieve greater gap filling capability while retaining impact strength.

U.S. Pat. No. 4,295,909, also to Baccei, disclosed anaerobic compositions which contain urethane-acrylate-capped prepolymers based on polybutadiene polyols or polyamines. The polybutadienes introduce a flexibility into the cured product which results in improved thermal, impact and cure-through gap properties. The polybutadiene polyols and polyamine reactants used to form the cured product comprise about 5–150 butadiene units and have at least about 70% of the butadiene units in the 1,4-configuration. These reactants are reacted with either a molar excess of a reaction product of a polyisocyanate with a polyol or just with a polyisocyanate. The product of this reaction is then capped with an hydroxyalkyl (meth)acrylate. U.S. Pat. No. 3,425,988 to Gorman discloses sealant compositions which are the reaction product of an organic polyisocyanate and a monomethacrylate-terminated ester.

None of the aforementioned compositions completely satisfy the need for toughened anaerobic compositions, particularly in applications where high compression loads and thermal shock is prevalent. For example, in certain applications where the composition forms a retaining function, such as the retention of bearings in helicopter rods, a composition which can tolerate high compressive loads for the cycle life of the part, while resisting crack propagation due to thermal shock is greatly needed. None of the aforementioned patents have disclosed compositions which adequately serve these and other needs.

SUMMARY OF THE INVENTION

Figure 1:
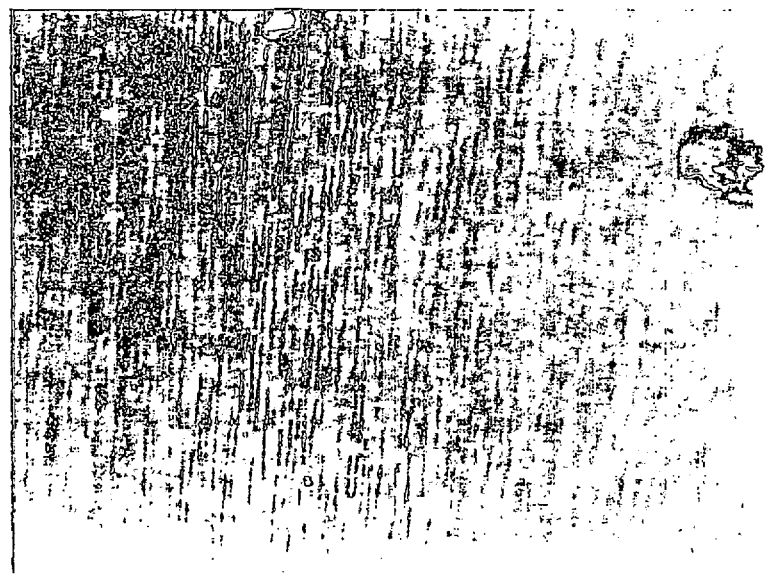
FIG. 1 is a photomicrograph of a cross-section magnified 200× of a cured film of an anaerobic adhesive composition made in accordance with Comparative Composition 1.

In one aspect of the invention there are provided anaerobic compositions, the reaction products of which exhibit enhanced toughness and resistance to crack propagation. These compositions have the capability of undergoing cyclic compressive loads for long periods of time without significant effect on their physical properties. In particular, the present compositions are particularly useful in retaining applications, where toughness characteristics are greatly needed. The anaerobic compositions of the present invention exhibit an excellent ability to resist break-down under high compressive loads, while retaining their physical properties at ambient temperature.

The inventive anaerobic compositions are useful as adhesives, sealants, coatings and the like. The compositions of the present invention include:

(a.) at least one (meth)acrylate monomer component;

(b.) at least one (meth)acrylate-terminated monomeric prepolymer component comprising polymer segments which are the reaction product of (i) a polybutadiene polyol or polyarnine and desirably an acrylonitrile/ butadiene copolymer polyol or polyamine, or an acrylonitrile/butadiene copolymer polyol or polyamine, with (ii) the molar excess of a reaction product of an aromatic or cycloaliphatic polyol with an aromatic or a cycloaliphatic polyisocyanate; and (c.) at least one (meth)acrylate-terminated monomeric prepolymer component comprising the reaction product of an organic polyisocyanate and an acrylate ester having an active hydrogen.

A method of preparing the inventive compositions by admixing the components together is also provided. Additionally, a method of bonding substrates together by application of the inventive compositions to a substrate surface followed by permitting them to cure under anaerobic conditions is also provided.

Free radical initiators are used to initiate cure, alone or in combination with accelerators, stabilizers and other useful additives.

DETAILED DESCRIPTION OF THE INVENTION

The anaerobic adhesive compositions in the present invention include three types of monomer components. The first monomer component (a) is selected from (meth)acrylate monomers. The second monomer component (b) is a (meth) acrylate-terminated prepolymer which includes both flexible and rigid segments. The flexible segments are the reaction product of (i) an acrylonitrile/butadiene copolymer polyol or polyamine, with (ii) the molar excess of a reaction product of an aromatic or cycloaliphatic polyol with an aromatic or a cycloaliphatic polyisocyanate. Component (b) may desirably be dissolved in a compatible monomer such as polyethylene glycol methacrylate. The third monomer component (c) is a also (meth)acrylate-terminated prepolymer. This prepolymer is the reaction product of an organic polyisocyanate and an acrylate ester having an active hydrogen. It is the combination of these three monomer components which when reacted together produce enhanced toughness, thermal shock resistance and resistance to crack propagation. These enhanced physical properties are achieved without substantially compromising other physical properties of the adhesive composition.

Monomer Component (a)

Examples of (meth)acrylate monomers useful in the present invention include, without limitation, monomers corresponding to the following general formula I:

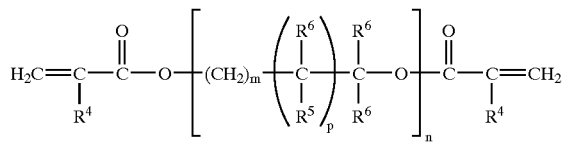

wherein $R^4$ is selected from hydrogen, halogen, and lower alkyl of 1–4 carbon atoms; $R^5$ is selected from the group consisting of hydrogen, —OH and

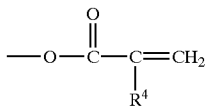

$R^6$ is a radical selected from hydrogen, lower alkyl of 1–4 carbon atoms and hydroxyalkyl of 1–4 carbon atoms; and m is an integer equal to at least 1, desirably from 1–20 and more desirably from 1 to 4; n is an integer equal to at least 1, desirably 1 to 20; and p is 0 or 1.

Typical of these monomers are mono-, di-, tri- tetra- and polyethylene glycol dimethacrylate and the corresponding diacrylates; di(pentamethylene glycol) dimethacrylate; tetraethylene glycol di(chloroacrylate); diglycerol diacrylate; diglycerol tetramethacrylate; butylene glycol dimethacrylate; neopentyl glycol diacrylate; and trimethylpropane triacrylate.

Particularly useful polymerizable crosslinkable components are ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopertyl glycoldiacrylate, pentaerythritol tetraacrylate, 1,2-butylene glycoldiacrylate, trimethylopropane ethoxylate tri(meth)acrylate, glycerol propoxylate tri(meth)acrylate, trimethylolpropane tri(meth) acrylate, dipentaerythritol monohydroxy penta(meth) acrylate, tri(propylene glycol) di(meth)acrylate, neopentylglycol propoxylate di(meth)acrylate, 1,4-butanediol di(meth) acrylate, polyethyleneglycol di(meth)acrylate (PEGMA), triethyleneglycol di(meth)acrylate, butylene glycol di(meth) acrylate, ethoxylated bisphenol A di(meth)acrylate and combinations thereof Other useful monomers include those acrylates derived from bisphenol-A, such as bisphenol-A dimethacrylate, hydrogenated bisphenol-A dimethacrylate, and ethoxylated bisphenol-A dimethacrylate (EBIPMA).

While di- and other polyacrylate esters have been found particularly desirable, monofunctional acrylate esters (esters containing one acrylate group) also may be used. When dealing with monofunctional acrylate esters, it is desirable to use an ester which has a relatively polar alcoholic moiety. Such materials are less volatile than low molecular weight alkyl esters and, more importantly, the polar group tends to provide intermolecular attraction during and after cure, thus producing more desirable cure properties, as well as a more durable sealant or adhesive. Particularly desirable are the polar groups selected from labile hydrogen, heterocyclic ring, hydroxy, amino, cyano, and halogen polar groups. Useful examples of compounds within this category include cyclohexyl methacrylate, tetrahydrofurfuryl methacrylate, hydroxyethyl acrylate, hydroxypropyl methacrylate, t-butylaminoethyl methacrylate, cyanoethylacrylate, and chloroethyl methacrylate. The materials are often incorporated as reactive diluents which are capable of copolymerizing with the various other polymerizable materials.

Other unsaturated reactive diluents, such as styrene and acrylonitrile, can also be used. When used, the concentration of such diluents should be less than about 10 percent by weight, and preferably about 2 to about 8 percent by weight of the composition, based on the total weight of the composition.

Monomer Component (b)

Monomer component (b) of the present invention is achieved by the chemical linking of a flexible polymeric butadiene polyol segment with a molar excess of a rigid diisocyanate, such as toluene diisocyanate or methylene diisocyanate, thereby forming urethane linkages. Before reacting with the polybutadiene polyol, the diisocyanate is desirably reacted in excess with another rigid moiety containing at least two active hydrogen atoms, such as hydroxy or amine groups, thereby capping the other rigid moiety with —NCO groups. By the term "rigid" segment is meant a segment or segments containing aromatic, heterocyclic or cycloaliphatic rings. By the term "flexible" segment is meant the segment comprising primarily linear aliphatic moieties containing internal unsaturation. Pendant functional groups, including aromatic, heterocyclic and cycloaliphatic, among others, as well as branching, may also be incorporated, provided that there is no substantial interference with the necessary flexible nature of the linear portion.

Illustrative of the polyisocyanates employed in the preparation of component (b) monomers are, among others, phenyl diisocyanate, toluene diisocyanate, 4,4'-diphenyl diisocyanate, 4,4'-diphenylene methane diisocyanate, dianisidine diisocyanate, 1, 5-naphthalene diisocyanate, 4,4'-diphenyl ether diisocyanate, p-phenylene diisocyanate, 4,4'-dicyclo-hexylmethane diisocyanate, 1,3-bis-(isocyanatomethyl) cyclohexane, cyclohexylene diisocyanate, tetrachlorophenylene diisocyanate, 2,6-diethyl-p-phenylenediisocyanate, and 3,5-diethyl-4,4'-diisocyanatodiphenyl-methane. Still other polyisocyanates that may be used are the higher molecular weight rigid polyisocyanates obtained by reacting polyamines containing terminal, primary and secondary amine groups or polyhydric alcohols, for example, the atkane, cycloalkane, alkene and cycloalkane polyols such as glycerol, ethylene glycol, bisphenol-A, 4,4'-dihydroxy-phenyldimethylmethane-substituted bisphenol-A, and the like, with an excess of any of the above-described isocyanates. These higher molecular weight urethane or ureide polyisocyanates may be represented by formula II:

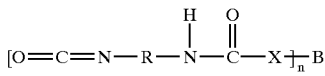

wherein R is an organic radical selected from alkyl, alkenyl, cycloalkyl, cycloalkenyl, aryl, aralkyl and alkaryl radicals of 2 to about 20 carbon atoms, both substituted and unsubstituted; X is —O— or

wherein R' is hydrogen or lower alkyl of 1 to 7 carbon atoms; B is a polyvalent organic radical selected from cycloalkyl, cycloalkenyl, aryl, aralkyl, alkaryl and heterocyclic radicals, both substituted and unsubstituted; and n is an integer 2 to about 6.

As indicated above, the diisocyanate is desirably reacted with another rigid segment comprising an aromatic, heterocyclic or cycloaliphatic compound containing at least two active hydrogen atoms, desireably diamines and more desirably diols. Suitable compounds are 2,2-(4,4'-dihydroxydiphenyl)-propane (i.e., bisphenol A), 4,4'-isopropylidenedicyclohexanol (i.e., hydrogenated bisphenol A), ethoxylated bisphenol A, propoxylated bisphenol-A, 2,2-(4,4'-dihydroxydiphenyl)-butane, 3,3-(4,4'-dihydroxydiphenyl)-pentane, α, α'-(4,4'-dihydroxydiphenyl)-p-diisopropylbenzene, 1,3-cyclohexane diol, 1,4-cyclohexane diol, 1,4-cyclohexanedimethanol, bicyclic and tricylic diols such as 4,8-bis-(hydroxymethyl)-tricyclo [$5.2.1.0^{2,6}$] decane, 2,2,4,4-tetramethyl-1,3-cyclobutanediol, hydroquinone, resorcinol, and 2,2-(4,4'-dihydroxydiphenyl)-sulfone, among others, as well as halogenated derivatives of the above, such as tetrabrominated ethoxylated bisphenol-A. These ring compounds may also be substituted with either reactive groups or unreactive groups such as alkyl groups containing about 1 to 4 carbon atoms. This reaction may be carried out at temperatures from room temperature to about 180° C., desirably about 40° to 120° C., depending upon the specific reactants selected. At the lower temperatures, use of standard catalysts may be desirable. Unreactive diluents may be used, if desired.

The polyisocyanate thus formed is reacted with a polymeric butadiene compound having at each end of the butadiene chain a functional group containing a reactive hydrogen atom, desirably in a hydroxyl group. The polybutadienes of this invention may have a preponderance of the butadiene units in a specific configuration, namely, the 1,4-configuration.

The 1,4-fraction of the butadiene polyols used in the present invention corresponds to formula III:

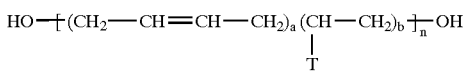

wherein a may vary from 0.65 to about 1.0, desirably from about 0.75 to about 0.85; b may vary from 0 to about 0.35, desirably from about 0.25 to about 0.15; n may vary from about 5 to about 150, desirably from about 10 to about 85; and T is hydrogen or an organic radical derived from such compounds as styrene and its simpler derivatives, lower alkyl acrylates and methacrylates, and acrylonitrile, the latter being especially desirable. Naturally, T should be selected so as not to substantially interfere with the properties imparted by the rest of the molecule. When b is not zero, the co-monomer residue weight percent to which b relates generally constitutes less than about 40 percent of the whole copolymer moiety and desirably less than about 30 percent.

The flexible polybutadiene, polybutadiene/acrylonitrile or copolybutadiene having functional groups containing an active hydrogen is reacted with the polyisocyanate in such proportion that the polyisocyanate is present in molar excess as to the concentration of the active hydrogen-containing groups on the polybutadiene. In this way a product is assured which has an —NCO group at each end of the polybutadiene segment. The molar excess of polyisocyanate may vary from about 0.05 to about 6.

This reaction may be carried out at temperatures from about room temperature to about 150° C., desirably from about 40° C. to about 120° C. After addition of the flexible diol, about 0.1 to 30 hours are required for completion at the preferred temperature range. The reaction may also be catalyzed, if desired, and unreactive diluents may be used for viscosity control.

The product of the above reaction is reacted with a molar equivalence, and desirably a molar excess, based on —NCO group content, of an acrylate or methacrylate ester containing a hydroxy or amine group on the non-acrylate portion thereof. This results in the adhesive/sealant monomer, or more accurately, prepolymer, being capped at both ends with acrylate or methacrylate functionality. Non-limiting examples of esters suitable for use correspond to formula IV:

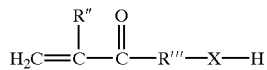

wherein X is as previously defined, R" is selected from hydrogen, chlorine and methyl and ethyl radicals; and R'" is a divalent organic radical selected from lower alkylene of 1–8 carbon atoms, phenylene and naphthylene.

The suitable hydroxy and amine-containing (meth)acrylate materials are exemplified by, but not limited to, such materials as hydroxyethyl acrylate, hydroxyethyl methacrylate, aminoethyl methacrylate, 3-hydroxypropyl methacrylate, aminopropyl methacrylate, hydroxyhexyl acrylate, t-butylaminoethyl methacrylate, hydroxy octyl methacrylate, the monoacrylate or monomethacrylate esters of bisphenol-A, the fully hydrogenated derivative of bisphenol-A, cyclohexyl diol, and the like.

The fully-prepared monomeric prepolymers of Component (b) correspond to formula V:

wherein R", and R'" are as previously defined; I is a polyisocyanate radical; D is an aromatic, heterocyclic or cycloaliphatic polyol or polyamine radical, desirably a diol, and more desirably a diol of a cycloaliphatic compound; Z is a polymeric or copolymeric polyol or poly radical of butadiene, the latter having a degree of polymerization of from about 5 to 150 and at least about 70 percent of the polybutadiene portion of the 1,4-configuration; z is an integer corresponding to the valiancy of Z; d is either 1 or 0; and i is 0 when d is 0, and otherwise is equal to one less than the number of reactive hydrogen atoms of D. As used herein, an asterisk (*) indicates a urethane (—NH—COO—) or ureide (—N—H—CO—NH—) bond.

Examples of block resins useful as Component (b) include those listed in Table I below.

TABLE I

Block Resin Examples Made From Component (b)

1) (HPMA*MDI)*$_x$[P(BD)]
2) (HPMA*TDI*HBPA*TDI)*$_x$[P(BD)]
3) (HPMA*MDI)*$_x$[P(BD-CN)]
4) (HPMA*TDI*HBPA*TDI)*$_x$[P(BD-CN)]
5) (HPMA*TDI*BPA*TDI)*$_x$[P(BD-CN)]
6) (HEMA*TDI*BPA*TDI)*$_x$[P(BD-CN)]
7) (HPMA*TDI*)$_x$[P(BD-CN)]
8) (HPMA*TDI*HBPA*TDI)$_x$[P(BD-STY)]

Key:
HPMA is hydroxypropyl methacrylate
MDI is methylene diisocyanate
TDI is toluene diisocyanate
P(BD) is polybutadiene
CN and STY are nitrile and styrene, respectively
X is an integer corresponding to the valency of the polyol
*indicates a urethane or ureide bond
All block resins were dissolved in about 15–40% by weight triethyleneglycol methacrylate (TRIEGMA) or polyethyleneglycol methacrylate (PEGMA) for ease of handling Monomer Component (c)

Monomer component (c) of the present invention is a polymerizable relatively rigid prepolymer. This component is the reaction product of a (meth)acrylate ester having an active hydrogen and an organopolyisocyanate. Useful (meth)acrylate esters desirably have two or more (meth) acrylate functional groups present to permit crosslinking of Component (c) in the final composition. Monomethacrylate esters may be incorporated, however, particularly in addition to Component (c) or in instances where crosslinking of Component (c) in the final composition is not desired. It is desirable to have the active hydrogen moiety, such as an hydroxy or amino group, on the non-acrylate portion thereof. Any of the difunctional (meth)acrylate compounds described above with respect to monomer Component (a) may be employed. Desirable difunctional (meth)acrylate monomers include triethyleneglycol (meth)acrylate and tetraethyleneglycol (meth)acrylate. Combinations of (meth) acrylates may be employed.

Illustrative of the polyisocyantes employed in the preparation of Component (c) monomers include, without limitation, toluene diisocyanate, 4, 4'-diphenyl diisocyanate, 4–4'-diphenylene methane diisocyanate, dianisidine diisocyanate, 1,5-naphthalene diisocyanate, 4–4'-diphenyl ether diisocyanate, p-phenylene diisocyanate, trimethylene diisocyanate, tetramethylene diisocyanate, hexamethylene diisocyanate, ethylene diisocyanate, cyclohexylene diisocyanate, nonamethylene diisocyanate, octadecamethylene diisocyanate, 2-chloropropane diisocyanate, 2,2'-diethylether diisocyanate, 3-(dimethylamine) pentane diisocyanate, tetrachlorophenylene diisocyanate, 1,4,3-heptene diisocyanate, and transvinylene diisocyanate. Additionally, the aforementioned polyisocyanates described with respect to monomer Component (b) may also be employed.

Other polyisocyanates include the higher molecular weight polyisocyanates obtained by reacting polyamines containing terminal, primary and secondary amine groups or polyhydric alcohols, such as alkane and alkene polyols including gylcerol, 1,2,6-hexanethanol, 1,5,pentanediol, ethyleneglycol polyethyleneglycol, bis-phenol-A, 4,4'-dihydroxyphenyldimethylmethane substituted bis-phenol-A, with an excess of any of the above-described isocyanates. These higher molecular weight urethane or ureide polyisocyanates may be represented by the formula VI:

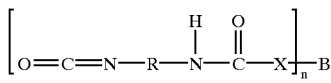

wherein B is a polyvalent organic radical selected from alkyl, alkenyl, cycloalkyl, aryl, aralkyl, alkaryl and heterocyclic radicals, both substitute and unsubstituted; X is selected from —O—and

radicals, wherein R' is selected from H and lower alkyl of 1–7carbon atoms; and n is an integer from 2–6 inclusive; R is an organic radial selected from alkyl, alkenyl, cycloalkyl, cycloalkenyl, aryl, aralkyl and alkaryl radicals of 2 to about 20 carbon atoms, both substituted and unsubstituted.

Desired organic polyisocyanates comprise the higher alkenyl diisocyanates, the cycloalkenyl diisocyanates, and the aromatic diisocyanates containing more than 8 carbon atoms and desirably 15 to 30 carbon atoms. Examples include, without limitation, octamethylene diisocyanate, durene diisocyanate, 4,4'-diphenyl diisocyanate and the higher molecular weight polyisocyanate reaction products mentioned hereinabove.

Examples of monomeric prepolymers useful as Component (c) correspond to the following structure VII:

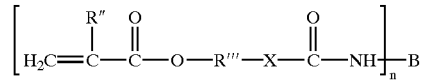

wherein B, X and n have the meanings set forth above, R" is selected from H, Cl and methyl or ethyl radicals; and R'" is a divalent organic radical selected from the group consisting of lower alkylenes having 1–8 carbon atoms, phenylene and naphthalene radicals.

The product of the above reaction is reacted with a molar equivalence, preferably a molar excess, based on —NCO group content, of an acrylate or methacrylate ester containing a hydroxy or amine group on the nonacrylate portion thereof. This results in an adhesive/sealant monomer, or more accurately, prepolymer, capped at both ends with acrylate or (meth)acrylate functionality. Esters suitable for use in this invention correspond to formula II above.

Formation of Components (b) and (c) may each occur in the presence or absence of diluents. Preferably, diluents which include the hydrocarbons, such as aliphatic, cycloaliphatic and aromatic hydrocarbons, for example, benzene, toluene, cyclohexane, hexane, heptane, and the like, are employed, but other diluents, such as methyl isobutyl ketone, diamyl ketone, methyl methacrylate, isobutyl methacrylate, lauryl methacrylate, triethyleneglycol methacrylate, polyethyleneglycol methacrylate, isobornyl methacrylate, and cyclohexyl methacrylate can also be beneficially utilized, if desired, especially where complete compatibility with the sealant system is desired. Mixtures of diluents may also be used.

The temperature employed in the reactions for making monomer Components (b) and (c) may each vary over a wide range. Where each of the individual materials used to make Components (b) and (c) are respectively combined in approximately chemical equivalent amounts, useful temperatures may vary from room temperature or below, e.g., 10° C. to 15° C., up to and including temperatures of 100° C. to 180° C. When reacting the simpler isocyanate adducts, each of the materials used to make these adducts may be combined at or near or at room temperatures, i.e. temperatures ranging from 20° C. to 30° C. At the lower reaction temperatures, use of a catalyst is preferred. When reacting the higher molecular weight isocyanate adducts, higher temperatures are more desirable, e.g., about 40° C. to about 150° C.

It will be recognized that the acrylate-terminated adducts of Components (b) and (c) can be prepared by processes other than that described above. Thus, for instance, the polyisocyanate compound can be reacted with a suitable hydroxyacrylate and this adduct reacted with a suitable methylene ether polymer having the necessary reactive hydrogen.

Compositions of the present invention cure to a hard, tough resin via a free-radical mechanism using any of a wide variety of known peroxy initiators. Illustrative of such initiators are the diacyl peroxides such as benzoyl peroxide; dialkyl peroxides such as di-tert-butyl peroxide; ketone peroxides such as methylethyl ketone peroxide; and peresters which readily hydrolyze, e.g., tert-butyl peracetate, tert-butyl perbenzoate and di-tert-butyl diperphthalate. A particularly useful class of peroxy initiators are the organic hydroperoxides such as cumene hydroperoxide (CHP), methylethylketone hydroperoxide, tert-butyl hydroperoxide (TBH) and methylethyl ketone hydroperoxide. Of these cumene hydroperoxide is especially desirable. The initiators may be used at a concentration of about 0.01 percent to about 10 percent by weight of the total formulation, and desirably about 0.1 percent to about 3 percent by weight. Another useful class of initiators comprises carbonyl-containing ultraviolet-activated free-radical generators, such as acetophenone, benzophenone, and the benzoin ethers. Initiator combinations may also be used.

It will also be understood that the curable composition of this invention can also be formulated as a two-part composition. In such a case, the initiator or one of a combination of initiators can comprise a second part which is combined with the first, monomeric part at the point of use. Thus, the monomer can be applied to one surface to be joined, the initiator can be applied to a second surface, and the two surfaces then formed. Similarly, an accelerator can be applied separately as a second part to a surface to be joined, e.g., as a "primer".

Anaerobic adhesive or sealant compositions of the present invention may also advantageously include polymerization accelerators such as organic imides (e.g., benzoic sulfimide) and primary, secondary or tertiary amines, and inhibitors or stabilizers of the quinone or hydroquinone families. The accelerators are generally employed in concentrations of less that 10 percent by weight, and the inhibitors in concentrations of about 10 to 1,000 parts per million (ppm). When prepared as anaerobic compositions, the adhesive compositions of this invention have the advantage of long-term stability and the ability to cure at room temperature upon exclusion of oxygen, such as when placed between the mating threads of a nut and bolt or the juxtaposed surfaces of a bearing and shaft. The anaerobic cure speed can be enhanced by application of moderate heat, e.g., up to about 150° C.

Examples of prepolymer resins which are useful as Component (c) include those listed in Table II below.

TABLE II

| Prepolymer Resin Examples Made From Component (c) | |
|---|---|
| 1) | (HPMA*MDI*HPMA) |
| 2) | (HPMA*TDI*HPMA) |
| 3) | (HPMA*TDI*HBPA*TDI*HPMA) |
| 4) | (HPMA*MDI*HBPA*TDI*HPMA) |

Key:
HPMA, MDI and TDI re as defined in Table I.
HBPA is hydrogenated bisphenol A.
*indicates a urethane or ureide bond
All resins were dissolved in about 15–40% by weight TRIEGMA or PEGMA for ease in handling Subsequent to reaction of the three monomer components, a cured, toughened solid material is formed. In addition to the enhanced physical properties discussed in the Examples below, discrete phase separations, e.g., rubbery domain portions, are observable. As mentioned earlier, phase separation of this nature is an indication of enhanced toughness in the cured polymer. The matrix of the cured polymer may be dominated by the first monomer Component (a). In this instance, discrete spherical like rubbery particles of cured Components (b) and (c) are dispersed within the solid matrix. The discrete particles themselves may be a combination of Components (b) and (c) or the result of their interaction.

It is more desirable for Components (b) and (c) to be present in a greater amount than Component (a) for certain applications. Various amounts of these components can be combined and tailored for specific applications. For example, Component (a) can be present in amounts of about 5 to about 30 percent by weight and desirably present in amounts of about 5 to about 10 percent by weight. Component (b) can be present in amounts of about 5 to about 75 percent by weight and desirably in amounts of about 20 to about 75 percent by weight. Component (c) can be present in amounts of about 20 to about 50 percent by weight and desirably about 30 to about 50 percent by weight. These amounts are based on the percent by weight of the total composition.

The formation of the discrete localized phase separation provides resistance to crack propagation. These discrete phases may be chemically bound to the other components in the composition. For example, Components (b) and (c) may react with each other, as well as with Component (a). Thus, the reaction product of these three reactive components, as shown by phase separation, may include a portion of the polymer in each phase.

The following examples are illustrative of the present invention but are not meant to be limited in any way.

EXAMPLES

A series of anaerobic adhesive compositions using Components (a), (b) and (c) were prepared, along with other additives generally incorporated for commercial use. These compositions are shown in Table III below. Anaerobic adhesive Composition 1 contains only two of the three monomer components, (a) and (c) and is included for comparison. Compositions 2–5 contain varying amounts of monomer Components (a), (b) and (c) and are representative of the inventive compositions. Compositions 6–9 also contained only two of the three monomer Components, (b) and (c), and are also included for comparison. Composition 10 contained neither Components (a), (b) or (c) and is representative of a commercially available retaining compound RC-680 sold by Loctite Corporation.

Figure 2:
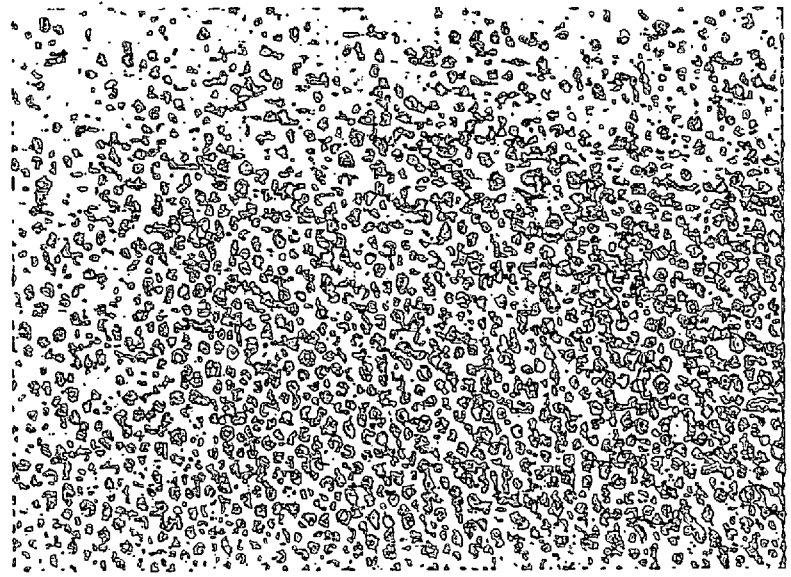
FIG. 2 is a photomicrograph of a cross-section of a cured film made from anaerobic adhesive composition made in accordance with Inventive Composition 5.
Figure 3:
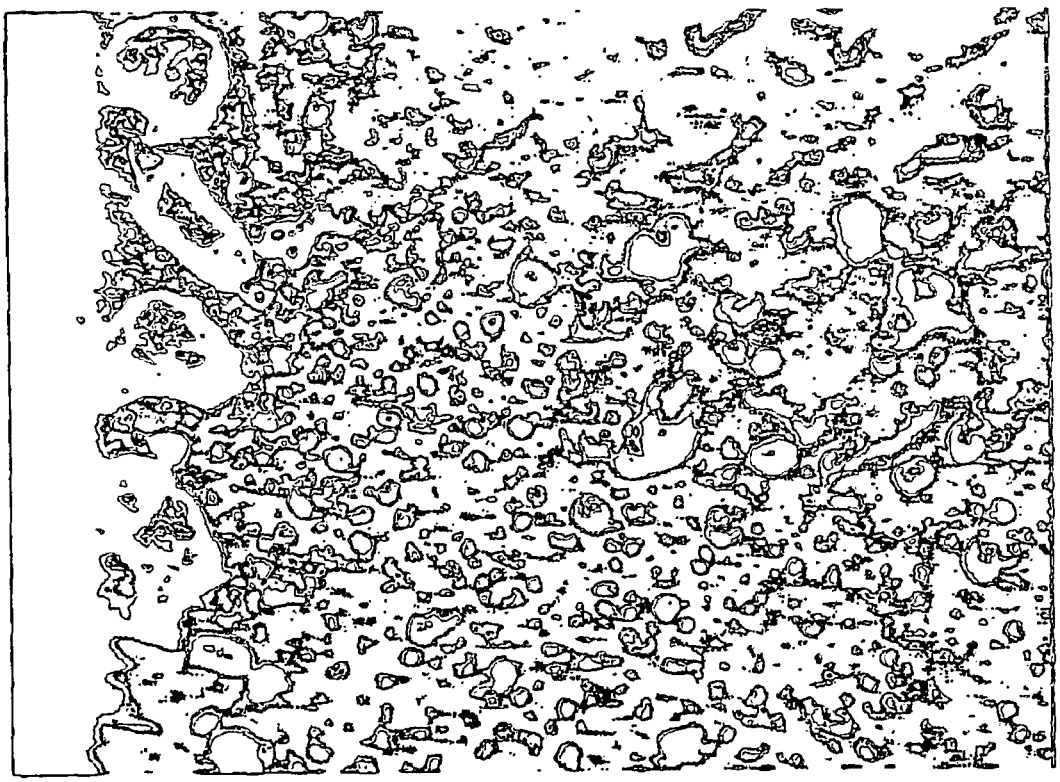
FIG. 3 is a photomicrograph of a cross-section of a cured film of an anaerobic adhesive composition made in accordance with Inventive Composition 5.

Inventive Compositions 2–5 demonstrate enhanced toughness values as compared to Comparative Compositions 1 and 6–8. Each of the inventive compositions showed discrete phase separation as viewed in FIGS. 2–3, which are photomicrograph cross-sections of films taken at 200×. This can be contrasted with a cross-section of Comparative Composition 1, which shows the absence of any phase separation.

Inventive Compositions 2–5 demonstrate the ability to retain their compression values subsequent to heat cure at 2 hours, 200° F., as well as after a 330° F. post cure. Curing at these temperatures, followed by cooling to room temperature, induces thermal shock into the polymer. The inventive compositions of the present invention exhibit enhanced toughness while maintaining their compression properties.

TABLE III

| Component | 1 | 2 | 3 | 4 | 5 | 6 | 7 | 8 | 9 | 10 |
|---|---|---|---|---|---|---|---|---|---|---|
| | Compositions (% wt.) | | | | | | | | | |
| Component (a)[1] | 8.40 | 7.90 | 7.90 | 7.90 | 9.09 | — | — | — | — | 0.00 |
| Component (b)[2] | 0.00 | 10.00 | 20.00 | 30.00 | 40.00 | 10.00 | 20.00 | 30.00 | 40.00 | 0.00 |
| Component (c)[3] | 77.00 | 67.00 | 57.00 | 47.00 | 37.25 | 0.00 | 0.00 | 0.00 | 0.00 | 0.00 |
| EBIPMA | — | — | — | — | — | 58.15 | 58.15 | 58.15 | 48.15 | 61.15 |
| Acrylic Acid | 5.64 | 6.00 | 6.00 | 6.00 | 6.00 | 6.00 | 6.00 | 6.00 | 6.00 | 0.00 |
| HPMA | 2.96 | 3.00 | 3.00 | 3.00 | 3.00 | 20.00 | 10.00 | — | — | 33.00 |
| CHP | 2.84 | 3.00 | 3.00 | 3.00 | 3.00 | 3.00 | 3.00 | 3.00 | 3.00 | 3.00 |
| Saccharine | 0.18 | 0.49 | 0.49 | 0.49 | 0.49 | 0.49 | 0.49 | 0.49 | 0.49 | 0.49 |
| Dyes, Stabilizers | 1.36 | 2.61 | 2.61 | 2.61 | 1.17 | 2.36 | 2.36 | 2.36 | 2.36 | 2.35 |
| Thickener | — | — | — | — | — | — | — | — | — | — |
| Total | 100 | 100 | 100 | 100 | 100 | 100 | 100 | 100 | 100 | 100 |
| | Compression Tests-Inch-Pounds (Ring & Collar)[4] | | | | | | | | | |
| RT cured (24 hours) | 1929 | 2037 | 2490 | — | 2450 | 4315 | 1871 | 1966 | — | 2312 |
| 2 hours 200° F. (heat cured) | 3439 | 4042 | 5044 | 5800 | 6800 | 3764 | 5137 | — | 2147 | 2537 |
| 2 hour 200° F. 1 hour 330° F. (heat cured) | 3306 | 4117 | 5372 | — | — | 4090 | 5211 | 5104 | — | — |
| Toughness[5] | 185 | 292 | 480 | — | — | 415 | 246 | 200 | — | — |

[1]PEGMA
[2][SS-56]-Shabbir please list chemical name
[3][RR II]-Shabbir please list chemical name.
[4]Measured according to ASTM D462 and SIO 10123
[5]Measured according to ASTM D-882 (inch-pounds/in$^3$ at 180° F. 18 hrs. followed by 330° F. 3 hrs).

The previous examples were intended to illustrate the present invention, but in are no way intended to limit the spirit and scope thereof, which is defined by the following claims.

What is claimed is:

1. An anaerobic adhesive composition, the reaction products of which demonstrate enhanced toughness and resistance to crack propagation, comprising:

(a) at least one (meth)acrylate monomer component;
   (b) at least one (meth)acrylate-terminated monomeric prepolymer component comprising polymer segments which are the reaction product of (i) an acrylonitrile/butadiene copolymer polyol or polyamine, with (ii) the molar excess of a reaction product of an aromatic or cycloaliphatic polyol with an aromatic or a cycloaliphatic polyisocyanate; and
   (c) at least one (meth)acrylate-terminated monomeric prepolymer component comprising the reaction product of (i) an organic polyisocyanate and (ii) a (meth)acrylate ester containing an active hydrogen.

2. The anaerobic adhesive composition of claim 1 further comprising a peroxide free radical initiator.

3. The anaerobic adhesive composition of claim 1 wherein the monomeric prepolymer of component (b) corresponds to the formula:

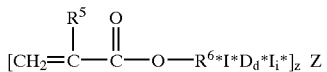

wherein $R^5$ is selected from hydrogen, chlorine and methyl and ethyl radicals; $R^6$ is a divalent organic radical selected from lower alkylenes having 1–8 carbon atoms, phenylene and naphthylene; * represents a urethane or ureide bond; I is a polyisocyanate radical; D is selected from an aromatic polyol or polyamine, a cycloaliphatic polyol or polyamine and a heterocyclic polyol or polyamine; Z is a polymeric or copolymeric polyol or poly radical of butadiene; z is an integer corresponding to the valiancy of Z; d is either 1 or 0; and i is 0 when d is 0, and otherwise equal to one less the number of reactive hydrogen atoms of D.

4. The anaerobic adhesive composition of claim 1 wherein the monomeric prepolymer of component (c) corresponds to the formula:

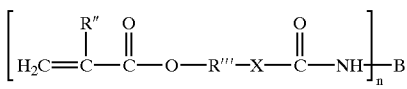

wherein B is a polyvalent organic radical selected from alkyl, alkenyl, cycloalkyl, aryl, aralkyl, alkaryl and heterocyclic radicals, both substitute and unsubstituted; X is selected from —O- and

radicals, wherein R' is selected from H and lower alkyl of 1–7 carbon atoms; and n is an integer from 2–6 inclusive; R" is selected from H, Cl and methyl or ethyl radicals; and R'" is a divaent organic radical selected from the group consisting of lower alkylenes having 1–8 carbon atoms, phenylene and naphthalene radicals.

5. The anaerobic adhesive composition of claim 1 wherein monomer component (a) corresponds to the formula:

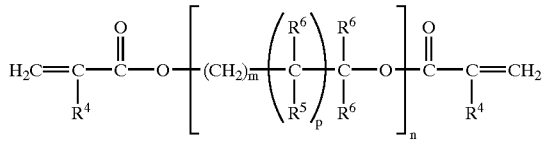

wherein $R^4$ is selected from the group consisting of hydrogen, halogen, and lower alkyl of 1–4 carbon atoms; $R^5$ is selected from the group consisting of hydrogen, —OH and

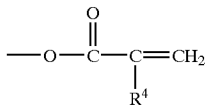

$R^6$ is a radical selected from hydrogen, lower alkyl of 1–4 carbon atoms and hydroxyalkyl of 1–4 carbon atoms, and m is an integer equal from 1–20; n is an integer equal to at least 1, and p is 0 or 1.

6. The anaerobic adhesive composition of claim 5, wherein n is an integer from 1 to 20.

7. The anaerobic adhesive composition of claim 1 wherein monomer component (a) is polyethylene glycol dimethacrylate.

8. The anaerobic adhesive composition of claim 1 wherein monomer component (a) is present in amounts of about 5 to about 30% by weight of the total composition.

9. The anaerobic adhesive composition of claim 1 wherein the monomeric prepolymer component (b) corresponds to one of the following structures:

(HPMA*MDI)*$_x$[P(BD)]; (HPMA*TDI*HBPA*TDI)*$_x$[P(BD)];

(HPMA*MDI)*$_x$[P(BD-CN)];
(HPMA*TDI*HBPA*TDI)*$_x$[P(BD-CN)];
(HPMA*TDI*BPA*TDI)*$_x$[P(BD-CN)];
(HEMA*TDI*BPA*TDI)*$_x$[P(BD-CN)]; (HPMA*TDI*)$_x$[P(BD-CN)]; and
(HPMA*TDI*HBPA*TDI)$_x$[P(BD-STY)]; wherein HPMA is hydroxypropyl methacrylate, MDI is methylene diisocyanate, TDI is toluene diisocyanate, P(BD) is polybutadiene, CN is nitrile, HBPA is hydrogenated bisphenol A, x is an integer corresponding to the valency of the polyol and * indicates a urethane or ureide bond.

10. The anaerobic adhesive composition of claim 1 wherein the monomeric component (b) is present in amounts of about 5 to about 75% by weight of the total composition.

11. The anaerobic adhesive composition of claim 1 wherein monomeric component (c) corresponds to one of the following structures:

(HPMA*MDI*HPMA); (HPMA*TDI*HPMA);
(BPMA*TDI*HBPA*TDI*HPMA);
(PMA*MDI*HBPA*TDI*HPMA)

wherein BPMA is hydroxypropyl methacrylate, MDI is methylene diisocyanate, TDI is toluene diisocyanate, HBPA is hydrogenated bisphenol A and * indicates a urethane or ureide bond.

12. The anaerobic adhesive composition of claim 1 wherein monomeric component (c) is present in amounts of about 20 to about 50% by weight of the total composition.

13. The anaerobic adhesive composition of claim 1 wherein said peroxide free radical initiator is selected from the group consisting of diacyl peroxides, dialkyl peroxides, ketone peroxides, peresters and combinations thereof.

14. The anaerobic adhesive composition of claim 1 wherein said peroxide free radical initiator is selected from the group consisting of benzoyl peroxide, di-tertiary-butyl peroxide, methylethylketone peroxides, tertiary-butyl peracetate, tertiary-butyl perbenzoate, ditertiary-butyl diperphthalate; cumene hydroperoxide and combinations thereof.

15. A method of preparing an anaerobic adhesive composition comprising admixing
    (a) at least one (meth)acrylate monomer component;
    (b) at least one (meth)acrylate-terminated monomeric prepolymer component comprising polymer segments which are the reaction product of (i) an acrylonitrile/butadiene polyol or polyamine, with (ii) the molar excess of a reaction product of an aromatic or cycloaliphatic polyol with an aromatic or a cycloaliphatic polyisocyanate; and
    (c) at least one (meth)acrylate-terminated monomeric prepolymer component comprising the reaction product of (i) an organic polyisocyanate and (ii) a (meth)acrylate ester containing an active hydrogen.

16. A method of providing an adhesive bond having enhanced toughness and resistance to crack propagation comprising:
    (1) applying to a substrate an anaerobic adhesive composition comprising:
        (a) at least one (meth)acrylate monomer component;
        (b) at least one (meth)acrylate-terminated monomeric prepolymer component comprising polymer segments which are the reaction product of (i) an acrylonitrile/butadiene polyol or polyamine, with (ii) the molar excess of a reaction product of an aromatic or cycloaliphatic polyol with an aromatic or a cycloaliphatic polyisocyanate;
        (c) at least one (meth)acrylate-terminated monomeric prepolymer component comprising the reaction product of (i) an organic polyisocyanate and (ii) a (meth)acrylate ester containing an active hydrogen; and
        (d) at least one peroxide free radical initiator;
    (2) and allowing said composition to cure anaerobically.

* * * * *